United States Patent
Benthien et al.

(10) Patent No.: US 11,542,013 B2
(45) Date of Patent: Jan. 3, 2023

(54) AIRCRAFT SEAT FASTENING ASSEMBLY, SEAT ARRANGEMENT AND AIRCRAFT CABIN PROVIDED THEREWITH, AND AIRCRAFT

(71) Applicant: Airbus Operations GmbH, Hamburg (DE)

(72) Inventors: Hermann Benthien, Hamburg (DE); Matthias Hegenbart, Hamburg (DE); Peter Linde, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 438 days.

(21) Appl. No.: 16/859,148

(22) Filed: Apr. 27, 2020

(65) Prior Publication Data
US 2020/0339267 A1    Oct. 29, 2020

(30) Foreign Application Priority Data
Apr. 29, 2019    (DE) ...................... 10 2019 111 000.9

(51) Int. Cl.
*B64D 11/06*    (2006.01)
*B60N 2/08*    (2006.01)

(52) U.S. Cl.
CPC ............ *B64D 11/0696* (2013.01); *B60N 2/08* (2013.01)

(58) Field of Classification Search
CPC .............................. B64D 11/0696; B60N 2/08
See application file for complete search history.

(56) References Cited

U.S. PATENT DOCUMENTS

| | | | | |
|---|---|---|---|---|
| 5,878,859 A | * | 3/1999 | Borlinghaus | F16D 28/00 74/528 |
| 6,666,513 B2 | * | 12/2003 | Zheng | B60N 2/929 297/344.1 |
| 7,293,836 B2 | * | 11/2007 | Browne | B60N 2/4228 297/344.11 |
| 7,581,706 B2 | * | 9/2009 | Kennedy | B60N 2/0806 297/312 |

(Continued)

FOREIGN PATENT DOCUMENTS

DE    102007059156 A1    6/2009
DE    102009012626 A1    9/2010

(Continued)

OTHER PUBLICATIONS

German Search Report; priority document.

*Primary Examiner* — Brian M O'Hara
(74) *Attorney, Agent, or Firm* — Greer, Burns & Crain, Ltd.

(57) ABSTRACT

An aircraft seat fastening assembly, due to the use of electroactive polymers, facilitates the compensation of tolerances and the fastening of aircraft seats in the passenger cabin of the aircraft. A fixing actuator contains the electroactive polymer and can be switched electrically between a fixed state, in which a movement of a fastening region is not possible, and a non-fixed state, in which a movement of the fastening region is possible in a vertical direction. The aircraft seats can thereby be displaced in a continuously variable manner along the aircraft seat fastening rail. The aircraft seats can also be locked in a fully automated manner, and possibly from a central location. It is also conceivable to individually control the aircraft seats and/or the group(s) of seats.

17 Claims, 7 Drawing Sheets

(56) References Cited

U.S. PATENT DOCUMENTS

| | | | |
|---|---|---|---|
| 7,775,596 B2* | 8/2010 | Kennedy | B60N 2/20 |
| | | | 297/378.12 |
| 8,052,112 B2 | 11/2011 | Lawall et al. | |
| 8,401,742 B2 | 3/2013 | Schliwa et al. | |
| 8,746,416 B2 | 6/2014 | Gluck et al. | |
| 9,227,528 B2* | 1/2016 | Yamada | B60N 2/0705 |
| 2007/0063566 A1 | 3/2007 | Browne et al. | |
| 2009/0003929 A1 | 1/2009 | Rudduck et al. | |
| 2021/0047043 A1* | 2/2021 | Black | B64C 27/001 |

FOREIGN PATENT DOCUMENTS

| | | |
|---|---|---|
| DE | 102009014606 A1 | 10/2010 |
| EP | 3321174 A1 | 5/2018 |
| WO | 2009092493 A1 | 7/2009 |
| WO | 2009114751 A2 | 9/2009 |

\* cited by examiner

AIRCRAFT SEAT FASTENING ASSEMBLY, SEAT ARRANGEMENT AND AIRCRAFT CABIN PROVIDED THEREWITH, AND AIRCRAFT

CROSS-REFERENCES TO RELATED APPLICATIONS

This application claims the benefit of the German patent application No. 10 2019 111 000.9 filed on Apr. 29, 2019, the entire disclosures of which are incorporated herein by way of reference.

FIELD OF THE INVENTION

The invention relates to an aircraft seat fastening assembly. The invention also relates to a seat arrangement and an aircraft cabin, which use such an assembly, and to an aircraft equipped therewith.

BACKGROUND OF THE INVENTION

Seat fastening means for aircraft are available in different variants.

Mechanical clamping connections are usually used to fasten the seats to the cabin floor. To simplify mounting and to accommodate as large a number of passengers as possible, as a rule, several seats are combined to form a group of seats. The group of seats is fastened, on the cabin floor, to a seat rail which specifies a discrete grid, for example, of one inch. As a result of the fact that the groups of seats have to be mounted individually, there is a high outlay during production and also when exchanging any defective groups of seats. To date, the seat configuration, that is to say, the collective arrangement thereof in the cabin space, also cannot be changed by the crew. In addition, the rigid grid also does not allow for a flexible seat configuration.

For the prior art, reference is made to the following documents:
WO 2009/0 114 751 A2
DE 10 2009 012 626 A1
EP 3 321 174 A1
US 2007/0 063 566 A1
WO 2009/0 092 493 A1
DE 10 2007 059 156 A1

SUMMARY OF THE INVENTION

The invention is based on an object of improving the production, maintenance and the operation of aircraft.

The invention provides an aircraft seat fastening assembly, which is configured for mounting an aircraft seat on an aircraft and for compensating for dimensional tolerances, the aircraft seat fastening assembly comprising a fastening region for the aircraft seat and comprising a fixing actuator which contains an electroactive material, in particular an electroactive polymer, and which, as a result, can be switched electrically between a fixed state, in which the fastening region is fixed, and a non-fixed state, in which the fastening region can be displaced in a vertical direction.

The aircraft seat fastening assembly preferably comprises an aircraft seat mounting fitting, which is configured for mounting an aircraft seat of an aircraft on an aircraft seat fastening rail and for compensating for dimensional tolerances. It is preferable for the aircraft seat mounting fitting to comprise the fastening region and the fixing actuator in order to, as a result, be able to be switched electrically between a fixed state, in which the fastening region is fixed, and a non-fixed state, in which the fastening region can be displaced in a vertical direction which is orthogonal to a direction defined by the longitudinal direction of the aircraft seat fastening rail.

The aircraft seat fastening assembly preferably comprises an aircraft seat fastening rail comprising a rail crown which is configured to receive a further element of the aircraft seat fastening assembly, in particular an aircraft seat mounting fitting, and to grasp the further element in a force-fitting or form-fitting manner.

It is preferable for the fixing actuator to have an actuator fixing region, which is configured, in the fixed state, for fixing purposes, to grasp a further element of the aircraft seat fastening assembly, in particular an aircraft seat mounting fitting or an aircraft seat fastening rail, in a form-fitting or force-fitting manner.

The aircraft seat fastening assembly preferably comprises at least one guide flange which extends in a vertical direction and is intended for the lateral guidance of a further element of the aircraft seat fastening assembly, in particular an aircraft seat mounting fitting or an aircraft seat fastening rail.

It is preferable for the guide flange to be arranged in the form of a fitting guide flange on the aircraft seat mounting fitting. It is preferable for the fitting guide flange to have a lateral actuator surface on which the fixing actuator is arranged. It is preferable for the fitting guide flange to be able to be plugged into a further element of the aircraft seat fastening assembly, in particular an aircraft seat fastening rail.

It is preferable for the guide flange to be arranged in the form of a rail guide flange on the aircraft seat fastening rail, in particular on a rail crown. It is preferable for the rail guide flange to comprise a lateral flange fixing region which is configured, in the fixed state, to grasp an aircraft seat mounting fitting, in particular an actuator fixing region, in a force-fitting or form-fitting manner.

It is preferable for the actuator fixing region and/or the flange fixing region to have a toothed structure and/or a friction lining.

The aircraft seat fastening assembly preferably comprises at least one support flange for supporting a further element of the aircraft seat fastening assembly, in particular an aircraft seat mounting fitting or a base plate. It is preferable for the support flange to protrude in a horizontal direction.

It is preferable for the support flange to be arranged in the form of a fitting support flange on the aircraft seat mounting fitting. It is preferable for the fitting support flange to be configured to support the aircraft seat mounting fitting in a vertical direction.

It is preferable for the support flange to be arranged in the form of a rail support flange on the aircraft seat fastening rail, in particular on a rail crown. It is preferable for the rail support flange to be configured to support a base plate in a vertical direction.

It is preferable, in the non-fixed state, for the fastening region to be able to be displaced in a horizontal direction.

It is preferable for the fixing actuator to be in the fixed state if no voltage is applied. It is preferable for the fixing actuator to be in the non-fixed state as long as a voltage is applied.

It is preferable for the fixing actuator to shrink in the thickness direction thereof during the transition from the fixed state to the non-fixed state, in order to generate a gap which allows for movement of the fastening region.

It is preferable for the fixing actuator to expand in the thickness direction thereof during the transition from the non-fixed state to the fixed state, in order to close a gap and generate a force fit or form fit in order to prevent a movement of the fastening region.

The invention provides a seat arrangement for an aircraft cabin of an aircraft, comprising an aircraft seat and a preferred aircraft seat fastening assembly, the aircraft seat being mounted on the fastening region and being able to be fastened in the aircraft cabin and to the aircraft by means of the fixing actuator.

The invention provides an aircraft cabin, in particular a passenger cabin, for an aircraft, comprising a preferred seat arrangement, the aircraft seat being fastened in the aircraft cabin by means of the fixing actuator.

The invention provides an aircraft, in particular airplane, having a preferred seat arrangement or a preferred aircraft cabin, the aircraft seat being fastened to the aircraft by means of the fixing actuator.

Advantages and effects of the invention will be explained in greater detail below. It should be noted that not all advantages or effects have to be realized at the same time or to the same extent.

By way of the EAP rail fastening element (EAP, electroactive polymer) described herein, fully automated tolerance compensation and continuously variable positioning of elements or parts can be made possible during the assembly in the x, y and z directions for a toolless manufacturing operation, for example by means of clamps.

The EAP rail fastening element can, for example, be actuated by an electrical voltage, as a result of which a gap between the rail element and the fitting element is made possible by an EAP actuator which shrinks in the thickness direction. In this way, all tolerances can also be compensated for and the part can be positioned.

After the electrical voltage has been switched off, the EAP actuator elements are no longer actuated, such that they increase in size in the thickness direction and the position of the fitting is defined, at least in a clamping manner, on the inner side of the rail.

Fine adjustment can also be possible as a result. The adjustment can be performed with an accuracy better than $1/10$ mm Toolless installation and manufacture can also be possible.

This allows for exact positioning of the structural elements, cabin elements and system elements. The overall number of parts can also be reduced because rivets and bolts for fastening purposes can be dispensed with. Positioning without intermediate steps is also possible.

Overall, by way of the above-described measures, the outlay, and thus the costs, can be reduced and the quality can be improved.

The fine adjustment of the EAP rail fastening means allows for the positioning in the x, y and z directions with an accuracy better than one millimeter.

The invention is based on the idea that electrical voltage is applied to an EAP rail element, as a result of which the element is actuated and shrinks in the thickness direction. As a result, the fitting is released.

In this way, tolerances can also be compensated for by moving the fitting in the rail.

After the electrical voltage has been switched off, the EAP actuator element returns to the original state thereof again and the thickness thereof increases, such that the fitting position is defined in the rail by a clamping action. An improvement may lie in the use of toothed structures or a friction lining, which may improve the form fit.

It is also possible for the fittings to be controlled individually by the crew, for example, such that the seat configuration can also be changed during the usual operation of the aircraft. Empty seats can thus be pushed together, for example, such that further space for baggage items can be formed. Conversely, it is possible for the seat spacing to be reduced for smaller individuals, whereas a larger seat spacing can be set for larger individuals.

Overall, as a result of the continuously variable adjustment of the seats, it is also conceivable for one or even a plurality of further seat rows to be accommodated in the cabin, without the required legroom being limited to an excessive extent. This is possible since, in principle, each group of seats can be adapted to the individual requirements of the passengers by way of the ideas described herein.

BRIEF DESCRIPTION OF THE DRAWINGS

Exemplary embodiments will be explained in greater detail on the basis of the attached schematic drawings, in which.

DETAILED DESCRIPTION OF THE PREFERRED EMBODIMENTS

Figure 1:
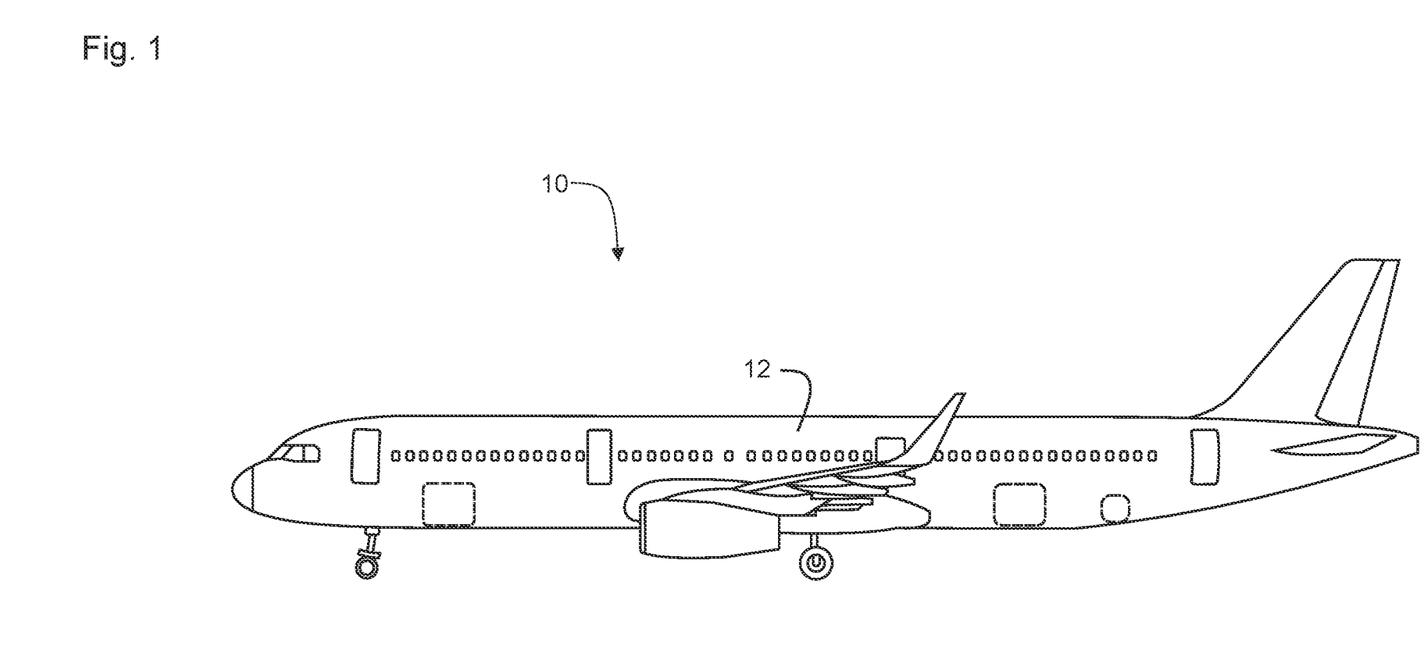
FIG. 1 shows an exemplary embodiment of an aircraft.
Figure 2:
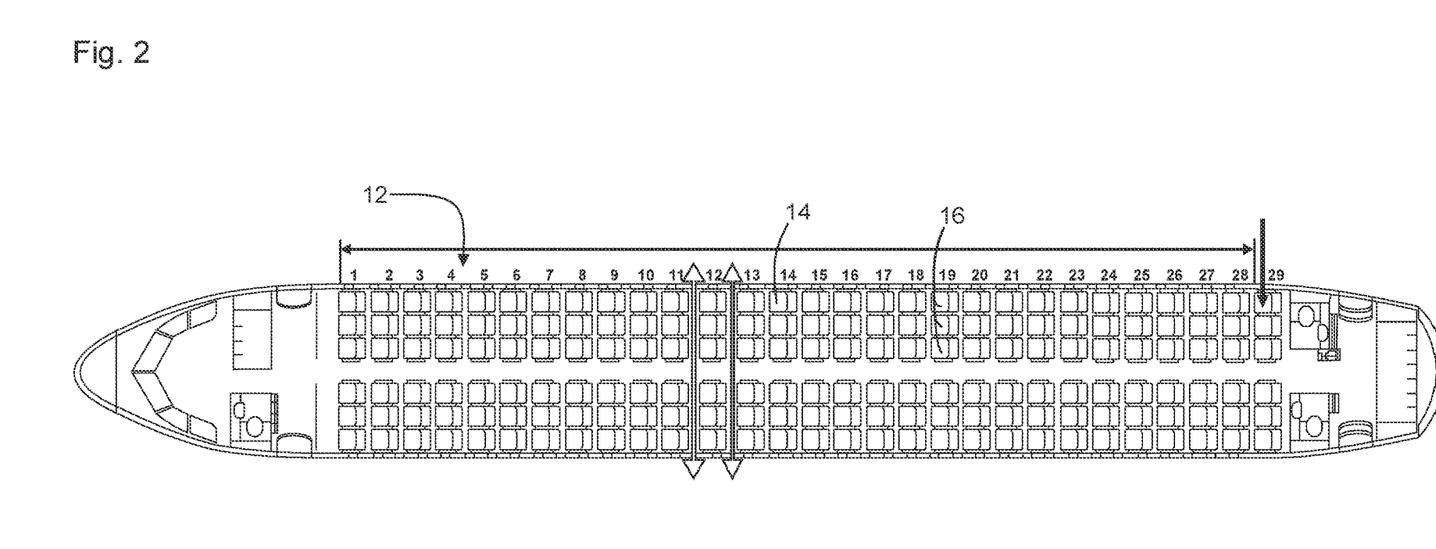
FIG. 2 shows an exemplary embodiment of a passenger cabin.

Reference is first of all made to FIGS. 1 and 2, which show an exemplary embodiment of an aircraft 10. The aircraft 10 comprises a passenger cabin 12. The passenger cabin 12 contains a multiplicity of aircraft seats 14, which can be combined to form a multiplicity of groups of seats 16.

For the purposes of fastening the groups of seats 16, an aircraft seat fastening assembly 18 is provided, which will now be explained in greater detail on the basis of FIGS. 3 to 7*a* and 7*b*. The aircraft seat fastening assembly 18 comprises an aircraft seat fastening rail 20. The aircraft seat fastening rail 20 can be connected to the fuselage structure of the aircraft 10 in a known manner. The aircraft seat fastening rail 20 can be configured in the form of an I beam 22.

Figure 3:
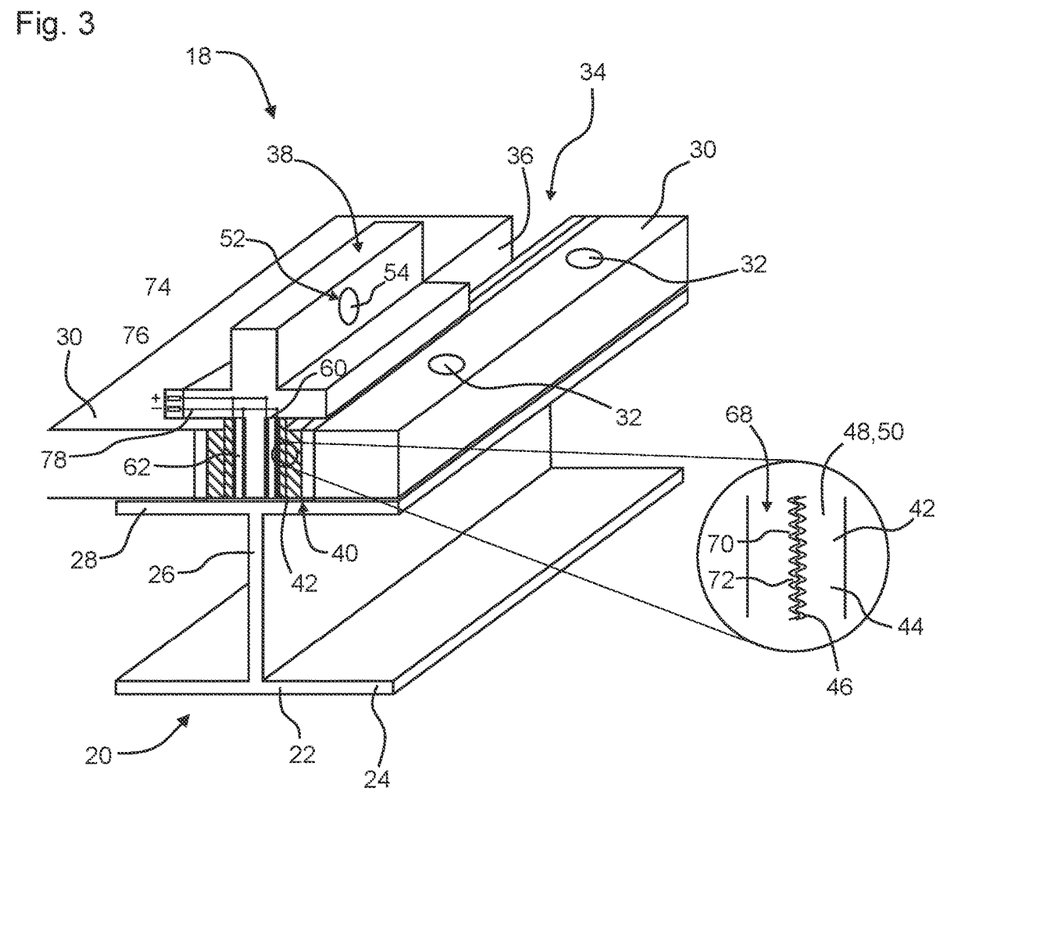
FIG. 3 shows an exemplary embodiment of an aircraft seat fastening assembly.
Figure 4:
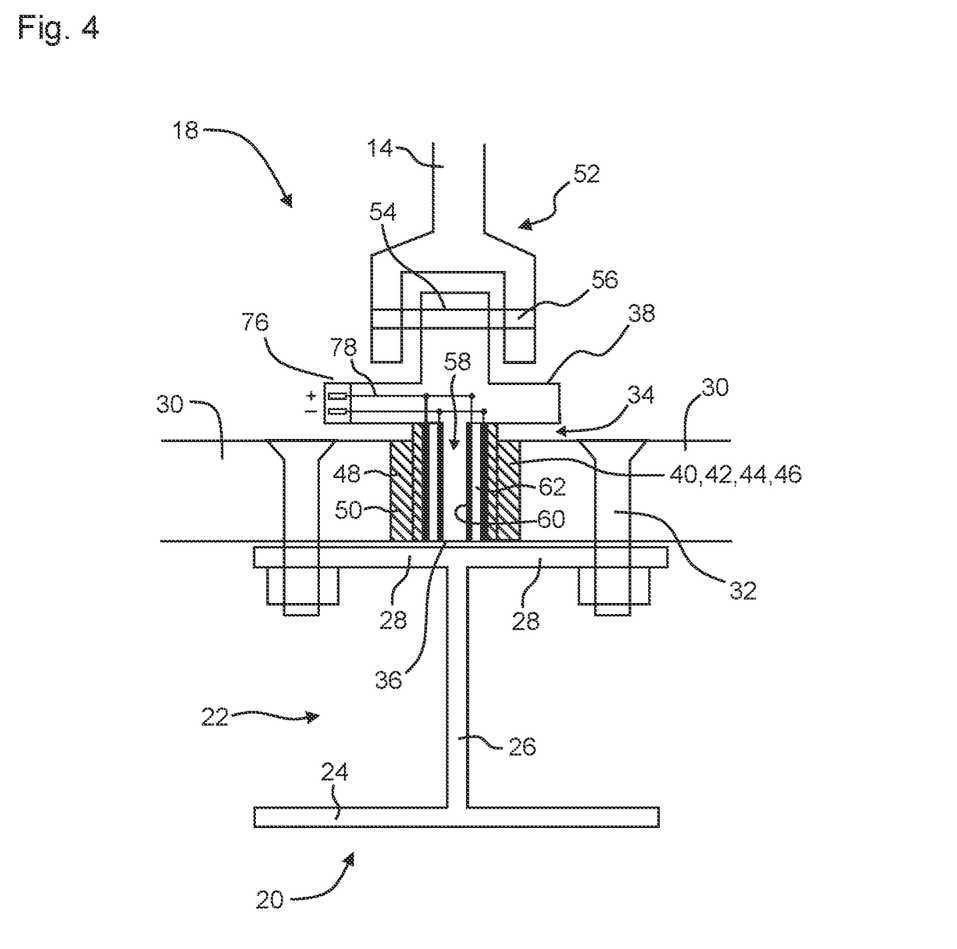
FIG. 4 shows a perspective view of the aircraft seat fastening assembly.

The aircraft seat fastening rail 20 can have a horizontally extending rail foot 24. A rail web 26 preferably extends, centrally in the vertical direction, from the rail foot 24. Two rail support flanges 28, which preferably likewise extend in the horizontal direction, are preferably arranged at the upper end of the rail web 26. The rail support flanges 28 preferably support a multiplicity of base plates 30 which can be fastened to the aircraft seat fastening rail 20 by means of screw fasteners 32. Instead of the screw fasteners 32, use can also be made of another suitable fastening type.

The aircraft seat fastening rail 20 also comprises a rail crown 34. The rail crown 34 defines a vertical cutout 36 in order to receive an aircraft seat mounting fitting 38.

The rail crown 34 can have two rail guide flanges 40. The rail guide flanges 40 extend substantially in the vertical direction and along the longitudinal direction which is defined by the aircraft seat fastening rail 20. The rail guide flanges 40 also delimit the cutout 36.

The aircraft seat fastening rail 20 can also have a rail fixing region 42, which is configured to grasp the aircraft seat mounting fitting 38 in a force-fitting and/or form-fitting manner.

Preferably, the rail fixing region 42 is provided on lateral vertical surfaces of the rail guide flanges 40 and faces toward the cutout 36.

The rail fixing region 42 can be formed by a toothed plate 44 which has a toothed structure 46. As illustrated in particular in FIG. 4, the protrusions and indentations of the toothed structure 46 extend in such a way that the tooth crown of the teeth of the toothed structure extends substantially parallel to the longitudinal direction of the aircraft seat fastening rail 20.

The rail fixing region 42 can also be formed by a friction plate 48 which has a friction lining 50. A combination of the toothed plate 44 and the friction plate 48 is also conceivable in which use is made of a toothed structure 46 which is coated with the friction lining 50.

Figure 5:
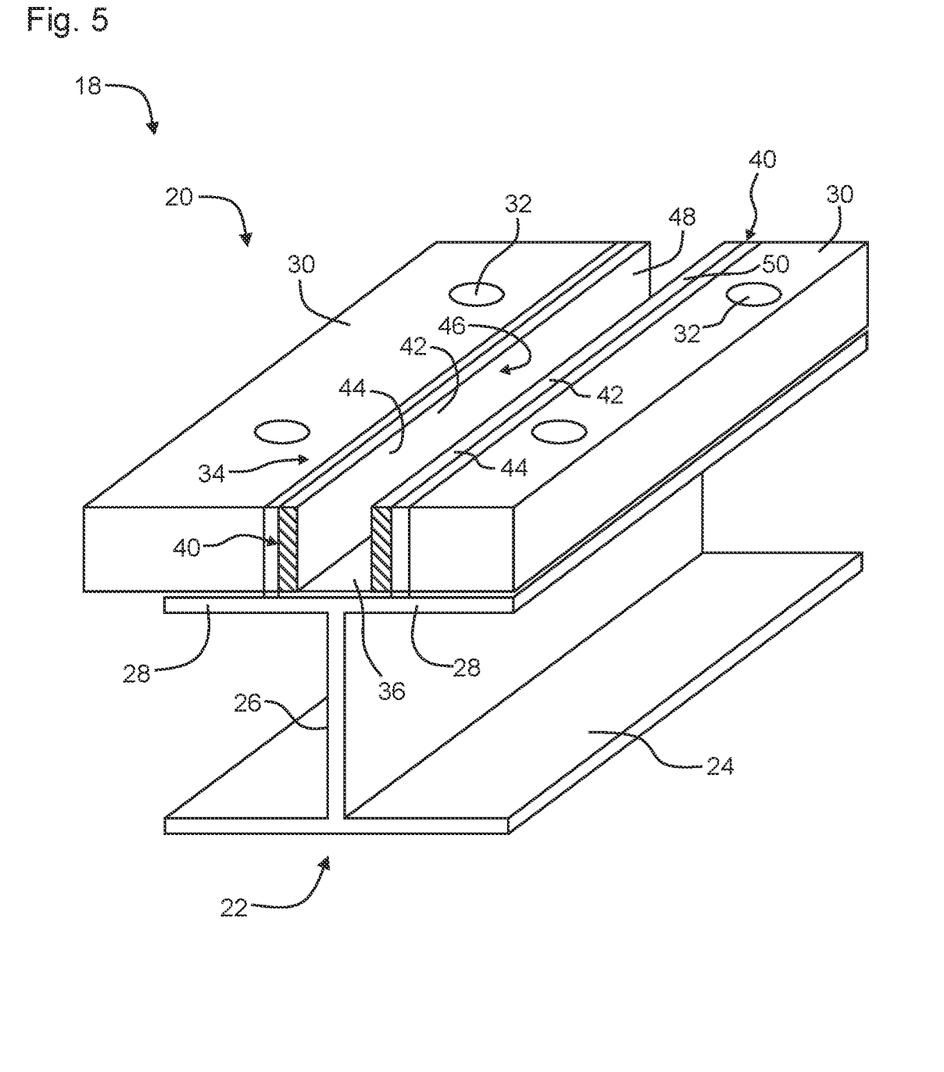
FIG. 5 shows an exemplary embodiment of an aircraft seat mounting fitting.

The aircraft seat fastening assembly 18 also comprises the aircraft seat mounting fitting 38. The aircraft seat mounting fitting 38 has a fastening region 52 for fastening the aircraft seat 14 to the aircraft seat mounting fitting 38. In the present case, the fastening region 52 comprises a fastening opening 54, into which a fastening bolt 56 for the fastening of the aircraft seat can be inserted.

The aircraft seat mounting fitting 38 can also have a fitting guide flange 58.

The fitting guide flange 58 extends substantially downward in the vertical direction and thus preferably counter to the direction of the fastening region 52. The fitting guide flange 58 is also preferably configured to be narrower than the fastening region 52.

The fitting guide flange 58 has lateral actuator surfaces 60 on which a fixing actuator 62 is arranged and fastened.

The fixing actuator 62 comprises an actuator region 64 and two electrode regions 66. At least the actuator region 64 contains an electroactive polymer which, when a voltage is applied to the electrode regions 66, deforms such that the fixing actuator 62 contracts in the thickness direction thereof (in the horizontal direction in this case). The electrode regions 66 can likewise contain electroactive polymer; they are configured to be electrically conductive in any case. The fixing actuator 62 can be integrally formed on the actuator surface 60 in a known manner.

The aircraft seat mounting fitting 38 also comprises an actuator fixing region 68. The actuator fixing region 68 is arranged on the outermost surface of the fixing actuator 62 and thus faces toward the rail crown 34, in particular the rail guide flanges 40. The actuator fixing region can likewise have a toothed structure 70 and/or a friction lining 72. In particular, the toothed structure 70 can preferably be configured in the same way as the toothed structure 46.

The aircraft seat mounting fitting 38 can also have two fitting support flanges 74. The fitting support flanges 74 can support the aircraft seat mounting fitting 38 on the rail guide flanges 40. The fitting support flanges 74 can also make it more difficult for dust and other contaminants to penetrate into the rail crown 34, in particular the cutout 36.

The aircraft seat mounting fitting 38 also comprises a connection device 76, which is electrically connected to the electrode regions 66 of the fixing actuator 62 by means of a line structure 78.

The connection device 76 is preferably arranged on one of the fitting support flanges 74.

Figure 6:
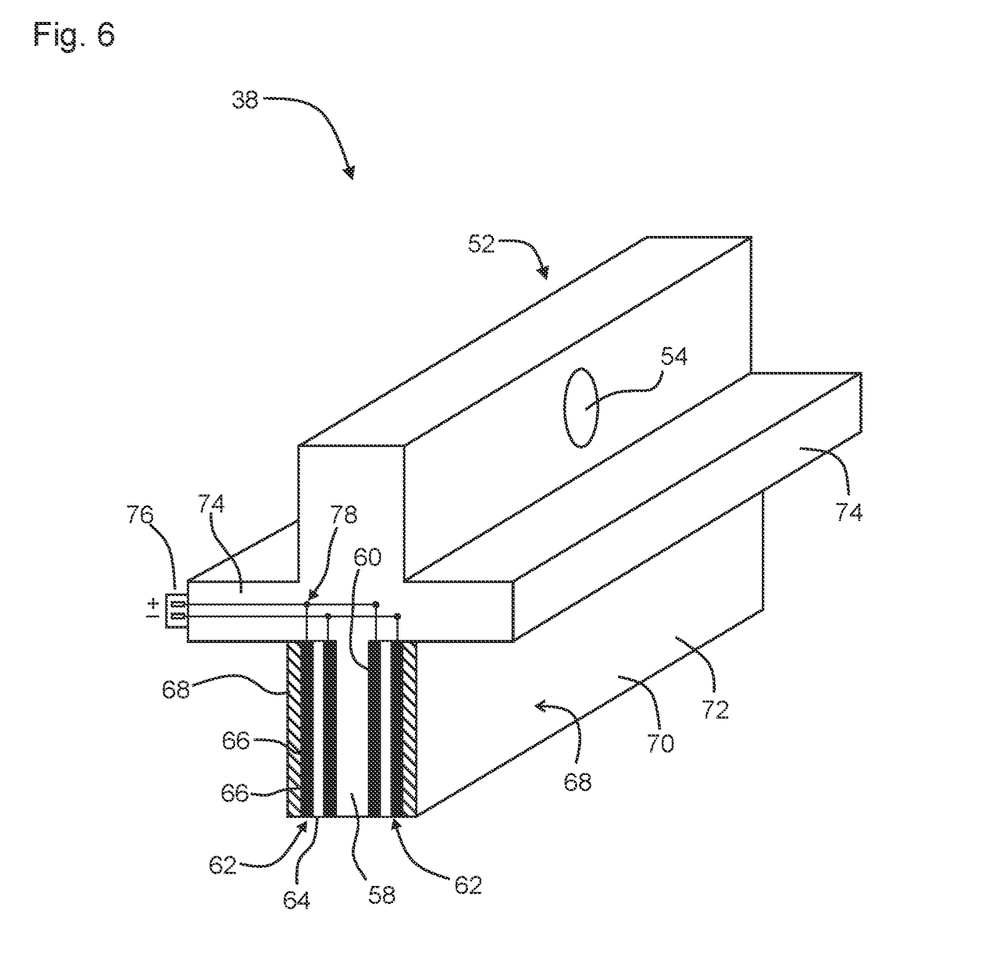
FIG. 6 shows an exemplary embodiment of an aircraft seat fastening rail.
Figure 7A:
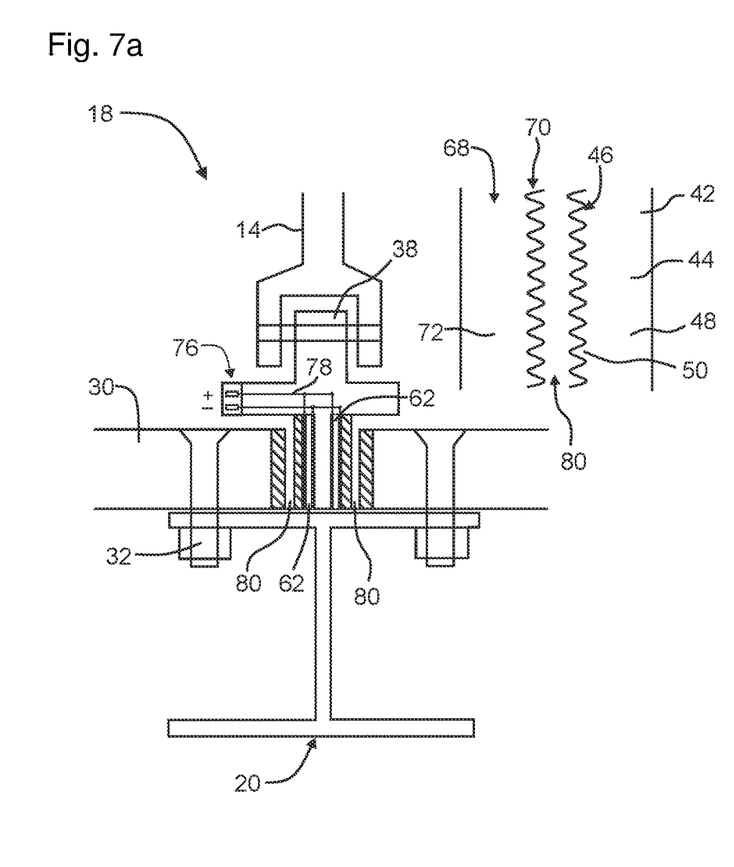
FIGS. 7*a* and 7*b* show an illustration of the aircraft seat fastening assembly from FIG. 4 in the non-fixed state (7*a*) and in the fixed state (7*b*).
Figure 7B:
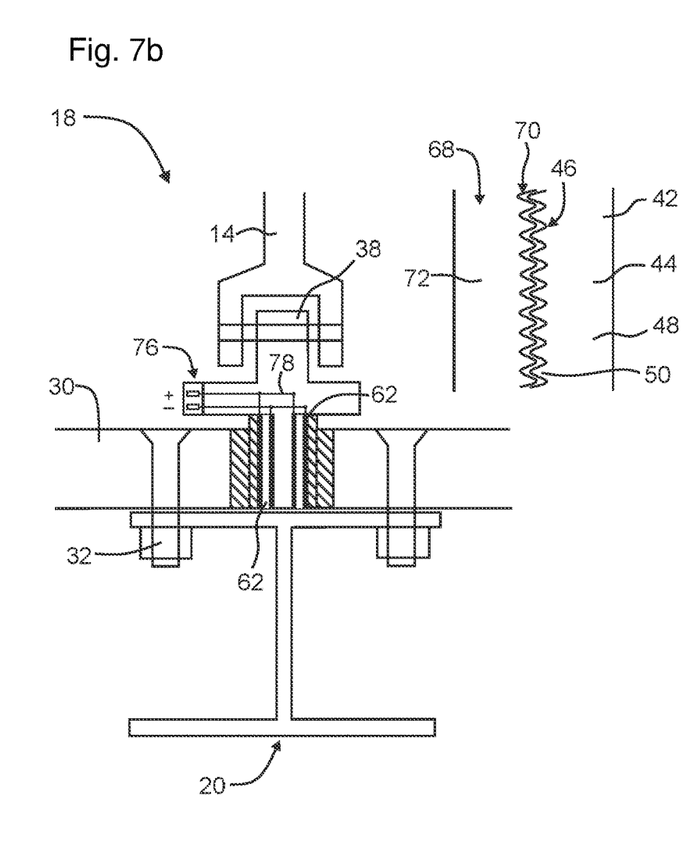

Reference is in particular made below to FIGS. 6, 7a and 7b, on the basis of which the functioning of the aircraft seat fastening assembly 18 will be described in greater detail.

Prior to the installation of the aircraft seat 14 or of the group of seats 16, a voltage is applied to the fixing actuator 62, such that the latter contracts in the thickness direction thereof. In this way, a gap 80 is in each case formed between the fixing actuator 62, in particular the actuator fixing region 68, and the rail crown 34, in particular the rail fixing region 42. The aircraft seat mounting fitting 38, and by way of the latter the fastening region 52, can thus be displaced in the vertical direction V, which extends orthogonally with respect to the longitudinal direction of the aircraft seat fastening rail 20, and the horizontal direction H, which extends parallel to the longitudinal direction of the aircraft seat fastening rail 20.

When the aircraft seat 14 has been arranged at the predetermined position thereof, which can for example be performed by a robot, the voltage which is applied to the fixing actuator 62 is switched off. In this way, the fixing actuator 62 expands again in the thickness direction, such that the gaps 80 are closed and the fixing actuator 62, in particular the actuator fixing region 68, is in engagement with the rail crown 34, in particular the rail fixing region 42. A force-fitting and form-fitting connection is therefore formed between the aircraft seat mounting fitting 38 and the aircraft seat fastening rail 20.

In summary, it should be noted that, by way of the aircraft seat fastening assembly 18 described herein and owing to the use of electroactive polymers, it is possible to significantly facilitate the compensation of tolerances and the fastening of aircraft seats 14 in the passenger cabin 12 of the aircraft 10. The fixing actuator 62 contains the electroactive polymer and can therefore be switched electrically between a fixed state, in which a movement of the fastening region 52 is not possible, and a non-fixed state, in which a movement of the fastening region 52 is possible in the vertical direction.

The aircraft seats 14 can thereby be displaced in a continuously variable manner along the aircraft seat fastening rail 20. The aircraft seats 14 can also be locked in a fully automated manner, and possibly from a central location. It is also conceivable to individually control the aircraft seats 14 and/or the group(s) of seats 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

10 Aircraft
12 Passenger cabin
14 Aircraft seat
16 Group of seats

18 Aircraft seat fastening assembly
20 Aircraft seat fastening rail
22 I beam
24 Rail foot
26 Rail web
28 Rail support flange
30 Base plate
32 Screw fastener
34 Rail crown
36 Cutout
38 Aircraft seat mounting fitting
40 Rail guide flange
42 Rail fixing region
44 Toothed plate
46 Toothed structure
48 Friction plate
50 Friction lining
52 Fastening region
54 Fastening opening
56 Fastening bolt
58 Fitting guide flange
60 Actuator surface
62 Fixing actuator
64 Actuator region
66 Electrode region
68 Actuator fixing region
70 Toothed structure
72 Friction lining
74 Fitting support flange
76 Connection device
78 Line structure
80 Gap
H Horizontal direction
V Vertical direction

The invention claimed is:

1. An aircraft seat fastening assembly, which is configured for mounting an aircraft seat on an aircraft and for compensating for dimensional tolerances, the aircraft seat fastening assembly comprising:
an aircraft seat fastening rail having a vertical cutout defined by rail guide flanges extending along a longitudinal direction of the seat fastening rail;
an aircraft seat mounting fitting having a fastening region configured to fasten to the aircraft seat and having a fitting guide flange configured to fit within the vertical cutout, and
a fixing actuator formed on the fitting guide flange, the fixing actuator contains an electroactive material,
wherein the electroactive material is configured to be switched electrically between a fixed state to grasp the rail guide flanges in a force-fitting or form-fitting manner, and a non-fixed state, in which the fitting guide flange with the fastening region can be displaced in a vertical direction with respect to the vertical cutout.

2. The aircraft seat fastening assembly as claimed in claim 1, wherein the vertical direction is orthogonal to the longitudinal direction of the aircraft seat fastening rail.

3. The aircraft seat fastening assembly as claimed in claim 1, wherein the aircraft seat fastening rail has a rail crown which is configured to receive the aircraft seat mounting fitting in the force-fitting or form-fitting manner.

4. The aircraft seat fastening assembly as claimed in claim 1, wherein the fixing actuator has an actuator fixing region, which is configured, in the fixed state, for fixing purposes, to grasp the aircraft seat mounting fitting in the form-fitting or force-fitting manner.

5. The aircraft seat fastening assembly as claimed in claim 2, wherein the rail guide flanges extend in the vertical direction and are configured to provide lateral guidance of the aircraft seat mounting fitting.

6. The aircraft seat fastening assembly as claimed in claim 5, wherein the fitting guide flange has a lateral actuator surface on which the fixing actuator is arranged, and the fitting guide flange is configured to be plugged into a further element of the aircraft seat fastening assembly.

7. The aircraft seat fastening assembly as claimed in claim 5, wherein the rail guide flanges comprise a lateral flange fixing region which is configured, in the fixed state, to grasp the aircraft seat mounting fitting in a force-fitting or form-fitting manner.

8. The aircraft seat fastening assembly as claimed in claim 2, wherein the aircraft seat mounting fitting further comprises a fitting support flange, the fitting support flange being configured to support the aircraft seat mounting fitting in the vertical direction.

9. The aircraft seat fastening assembly as claimed in claim 8, wherein the support flange is formed as a rail support flange on the aircraft seat fastening rail, the rail support flange being configured to support a base plate in the vertical direction.

10. The aircraft seat fastening assembly as claimed in claim 1, wherein the fixing actuator is configured to be in the fixed state if no voltage is applied to the fixing actuator.

11. The aircraft seat fastening assembly as claimed in claim 1, wherein the fixing actuator is configured to be in the non-fixed state as long as a voltage is applied to the fixing actuator.

12. The aircraft seat fastening assembly as claimed in claim 1, wherein the fixing actuator is configured to shrink in a thickness direction thereof during a transition from the fixed state to the non-fixed state, in order to generate a gap which allows for movement of the fastening region.

13. The aircraft seat fastening assembly as claimed in claim 1, wherein the fixing actuator is configured to expand in a thickness direction thereof during a transition from the non-fixed state to the fixed state, in order to close a gap and generate the force fit or form fit in order to prevent a movement of the fastening region.

14. The aircraft seat fastening assembly as claimed in claim 1, the aircraft seat being configured to be fastened in an aircraft cabin and to the aircraft by means of the fixing actuator.

15. The aircraft seat fastening assembly according to claim 1, wherein the electroactive material comprises an electroactive polymer.

16. A seat arrangement for an aircraft cabin of an aircraft comprising:
an aircraft seat, and
an aircraft seat fastening assembly, which is configured for mounting the aircraft seat on the aircraft and for compensating for dimensional tolerances, the aircraft seat fastening assembly comprising:
an aircraft seat fastening rail having a vertical cutout defined by rail guide flanges extending along a longitudinal direction of the seat fastening rail;
an aircraft seat mounting fitting having a fastening region configured to fasten to the aircraft seat and having a fitting guide flange configured to fit within the vertical cutout, and
a fixing actuator formed on the fitting guide flange, the fixing actuator containing an electroactive material,
wherein the electroactive material is configured to be switched electrically between a fixed state to grasp the rail guide flanges in a force-fitting or form-fitting manner, and a non-fixed state, in which the fitting guide flange with the fastening region can be displaced in a vertical direction with respect to the vertical cutout.

17. An aircraft comprising:
an aircraft cabin, and
a seat arrangement in the aircraft cabin, comprising:
an aircraft seat, and
an aircraft seat fastening assembly, which is configured for mounting the aircraft seat on the aircraft and for compensating for dimensional tolerances, the aircraft seat fastening assembly comprising:
an aircraft seat fastening rail having a vertical cutout defined by rail guide flanges extending along a longitudinal direction of the seat fastening rail;
an aircraft seat mounting fitting having a fastening region configured to fasten to the aircraft seat and having a fitting guide flange configured to fit within the vertical cutout, and
a fixing actuator formed on the fitting guide flange, the fixing actuator containing an electroactive material,
wherein the electroactive material is configured to be switched electrically between a fixed state to grasp the rail guide flanges in a force-fitting or form-fitting manner, and a non-fixed state, in which the fitting guide flange with the fastening region can be displaced in a vertical direction with respect to the vertical cutout.

* * * * *